Figure 1:
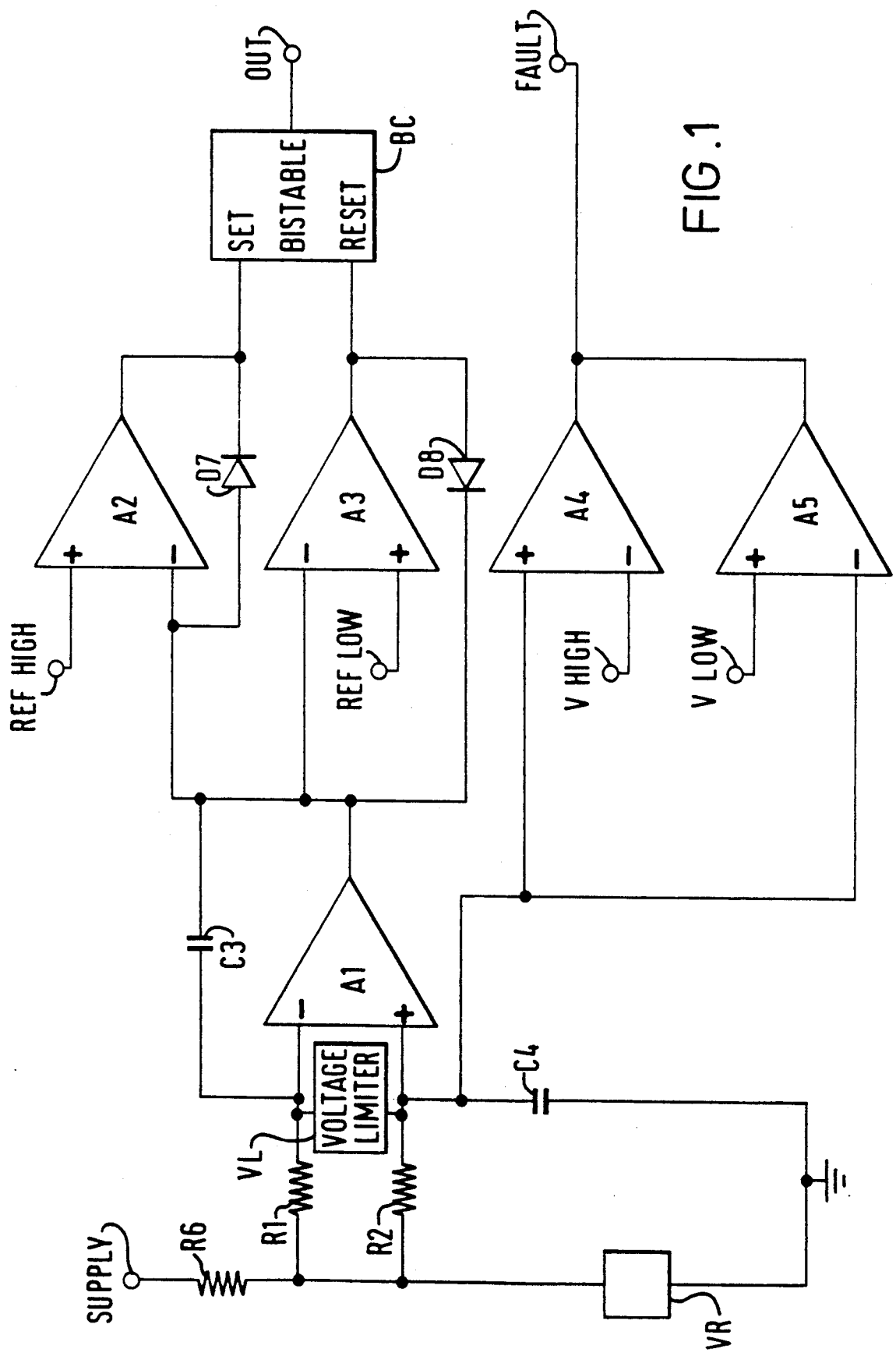

United States Patent [19]

Edwards

[11] Patent Number: 5,012,207

[45] Date of Patent: Apr. 30, 1991

[54] VARIABLE RELUCTANCE TRANSDUCER PROCESSING CIRCUIT FOR PROVIDING AN OUTPUT UNAFFECTED BY LOW FREQUENCY COMPONENTS

[75] Inventor: Karl Edwards, Birmingham, England

[73] Assignee: Lucas Industries Public Limited Company, Birmingham, England

[21] Appl. No.: 416,775

[22] Filed: Oct. 4, 1989

[30] Foreign Application Priority Data

Oct. 6, 1988 [GB] United Kingdom .................. 8823501
Feb. 22, 1989 [GB] United Kingdom .................. 8903984

[51] Int. Cl.$^5$ .......................... G01P 3/48; G01P 3/54; G01N 27/72; G01B 7/14
[52] U.S. Cl. ..................................... 324/166; 324/173; 324/207.12; 324/207.25; 324/225
[58] Field of Search ................... 324/166, 173, 207.11, 324/207.12, 207.13, 207.15, 207.24, 207.25, 225, 234, 236, 239

[56] References Cited

U.S. PATENT DOCUMENTS 4,575,677 3/1986 Dennis ............................... 324/166

Primary Examiner—Walter E. Snow
Attorney, Agent, or Firm—Nixon & Vanderhye

[57] ABSTRACT

A circuit for processing a high-frequency output signal from a variable reluctance transducer, this signal including an unwanted low frequency component, comprises a comparator having a first input receiving the transducer signal and a second input receiving the same transducer signal but via a low pass filter. The comparator therefore provides an output representing the high frequency variations in the transducer signal and substantially unaffected by the low frequency component. Alternatively, the transducer signal may be applied to a circuit providing a first output signal varying as the low frequency component and also providing a second output signal varying as the high frequency variations in the received transducer signal, the first output signal being used as a feedback control which tends to render the second output signal free of low frequency variations.

3 Claims, 5 Drawing Sheets

VARIABLE RELUCTANCE TRANSDUCER PROCESSING CIRCUIT FOR PROVIDING AN OUTPUT UNAFFECTED BY LOW FREQUENCY COMPONENTS

This invention relates to a circuit for processing the output signal from a variable reluctance transducer.

It is known to use variable reluctance transducers for monitoring the rotation of rotatably mounted elements. The variable reluctance transducer comprises a toothed wheel of magnetic material which is mounted for rotation with the element being monitored, and a sensor having a coil wound on a core and mounted so that in operation the successive teeth of the wheel pass the sensor. The gap between the wheel and the sensor varies as the wheel rotates, causing a corresponding variation in the reluctance of the magnetic path through the sensor core and therefore a corresponding variation in the current flowing through the sensor coil. The output from the sensor coil has a high frequency component representing the passage of the successive teeth of the transducer wheel past the sensor, and so dependent upon the rotary speed of the transducer wheel. However, the air gap between the transducer wheel and the sensor may vary cyclically owing to an eccentricity in the transducer wheel, e.g. due to an inaccuracy in the mounting of the wheel or to an inaccuracy in its manufacture. As a result, a low frequency component is superimposed on the high frequency output from the sensor. It will be appreciated that the high frequency is equal to the low frequency times the number of teeth on the transducer wheel.

In some applications, especially when the rotary speed of the shaft or other element being monitored does not vary greatly, a high pass filter is sufficient to remove the low frequency component and provide an error-free output. In other applications however this simple technique is unsatisfactory.

In one application for example, the variable reluctance transducer is used to monitor the rotary speed of a roadwheel of a vehicle. The toothed wheel of the transducer is fitted to the roadwheel and the output signal from the transducer is fed to a microprocessor which determines the rotary speed and acceleration or deceleration of the roadwheel. The range over which the speeds need to be measured is typically from approximately 0.5 revolutions per second to 45 revolutions per second. This speed range gives rise to a low frequency signal component varying between 0.5 and 45 Hz and a high frequency component varying between 22 and 1980 Hz (for a transducer wheel with 44 teeth). In monitoring the rotary speed of a roadwheel, it is required to detect when the wheel is about to lock, but the overlap in the high and low frequency ranges means that the use of a high pass filter would not be satisfactory. In order to improve the resolution of speed calculation using a microprocessor, an output signal with a 50% mark/space is required. Owing to the safety critical application, monitoring of the sensor condition is required to detect abnormal resistance. High noise immunity is required to reject signals produced by locked wheel oscillation and brake squeal, in which cases noise amplitude can exceed the signal.

In accordance with this invention, there is provided a circuit for processing an output signal from a variable reluctance transducer, the circuit comprising an input receiving said output signal from the variable reluctance transducer, said transducer output signal varying at high frequency, and a comparing means having a first input receiving said transducer signal and a second input receiving said transducer signal via a low pass filter so that the comparing means provides an output representing the high frequency transducer signal and substantially unaffected by any low frequency component in the transducer signal.

In this circuit, the comparing means provides an output which is related to the difference between the signal received from the transducer and a signal representing the low frequency component of the transducer output. The output from the comparing means thus represents the high frequency component of the transducer output and is unaffected by the low frequency component.

In a preferred embodiment the comparing means integrates the difference between the signals received at its two inputs and preferably comprises an operational amplifier connected as an integrator. Preferably an output circuit is provided, for producing a square wave from the high frequency alternating output signal from the comparing means. Preferably this output circuit comprises a pair of active clamps controlling the SET and RESET inputs of a bistable circuit, which provides a square wave output with 50% mark-space ratio. The active clamps have two functions. Firstly as the integrator output reaches each of the clamp levels, the state of the bistable is switched. Secondly, the clamps limit the voltage excursion of the integrator amplifier in both positive and negative directions. This defines a precise amount of integral hysteresis through which the output must travel when signal polarity changes, since both start and switching reference voltages are defined by the clamps.

Preferably the low pass filter, through which the transducer signal is passed to the second input of the comparing means, includes a shunt capacitor. The average charge on this capacitor corresponds to the series resistance of the sensor. A window detector monitors the capacitor voltage, to detect abnormal sensor resistances, but the system microprocessor only responds to this when the rotary speed is nil or below a low threshold.

Preferably a voltage limiting circuit is connected between the two inputs of the comparing means, having the effect of shunting the current, which normally flows from the transducer into the negative input node of the integrator amplifier, via the limiter circuit and into the low pass capacitor, but only after sufficient signal has already caused the integrator output to reach the active clamp level producing a valid signal. This provides an additional charging source for the capacitor so increasing the corner frequency of the filter, but only after a valid integrator signal has been produced, preventing loss of low frequency operation. Also by setting of the voltage limiter value, and due to the correspondence of sensor output voltage amplitude with signal frequency, a threshold frequency can be set below which the voltage limiter ceases to operate, approximating to a frequency tracking low pass filter. Activation of the voltage limiter can be achieved by either sensing loss of control of the negative input relative to the positive of the comparing means, or by activation of the integrator output active clamp.

Also in accordance with this invention, there is provided a circuit for processing an output signal from a variable reluctance transducer, the circuit comprising an input receiving said output signal from the variable reluctance transducer, said transducer output signal varying at high frequency, means connected to said input to provide a first output signal varying in accordance with any low frequency component in the transducer signal and also providing a second output signal varying in accordance with the high frequency variations in the transducer signal, and feedback means responding to the first output signal to exercise a control which tends to render the second output signal free of variations due to any said low frequency component in the transducer signal.

In a preferred embodiment, this circuit comprises an operational amplifier with the transducer connected to one of its inputs. The amplifier has three outputs, one of which is connected to the input by a feedback path. The first output signal appears on another of the three outputs of the amplifier and the second output signal appears on the third output of the amplifier. The first output signal is passed to a capacitor which is connected to a transconductance amplifier the output of which is connected as feedback to the signal input of the processing circuit. This capacitor is of relatively large value so that its charge varies with the low frequency component of the received transducer signal, the feedback acting to stabilise the input against these variations.

The second output signal from the operational amplifier is passed to a second capacitor, which is of smaller value than the first. The charge on this second capacitor varies with the high frequency component of the input signal, free of any variation due to the low frequency component. From this second capacitor, a square wave signal can be taken which has a 50% mark-space ratio.

An excessive variation of the charge on the first capacitor can be detected, preferably using a window detector, to indicate a low frequency component of excessive amplitude in the input signal.

Figure 2A:
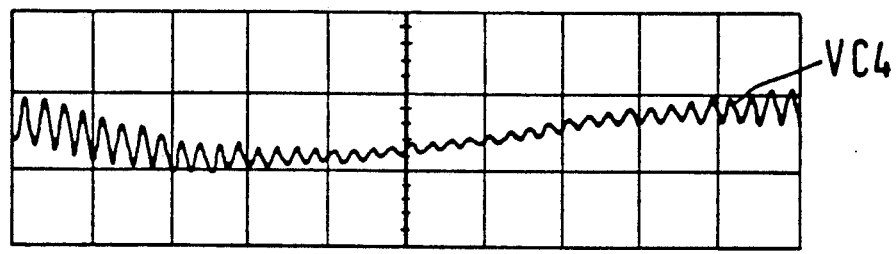
Figure 2B:
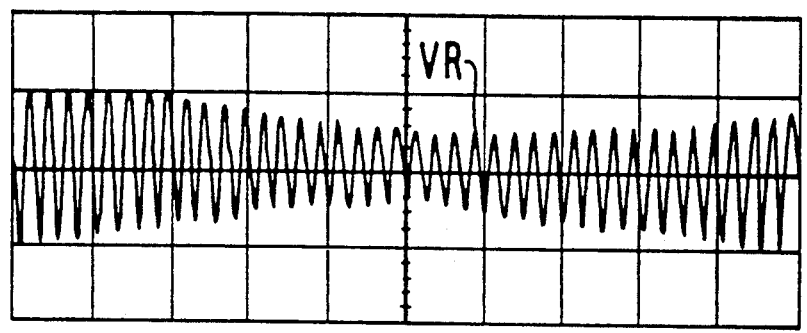
Figure 2C:
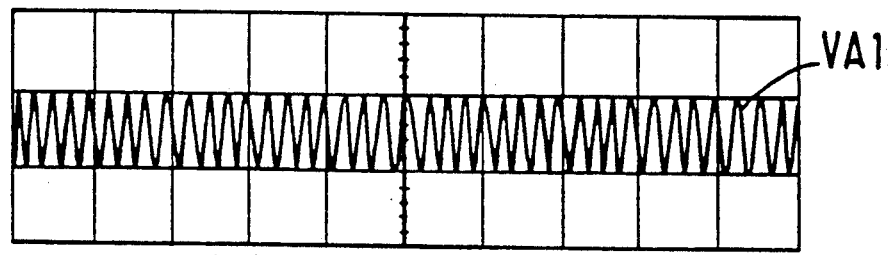
Figure 3:
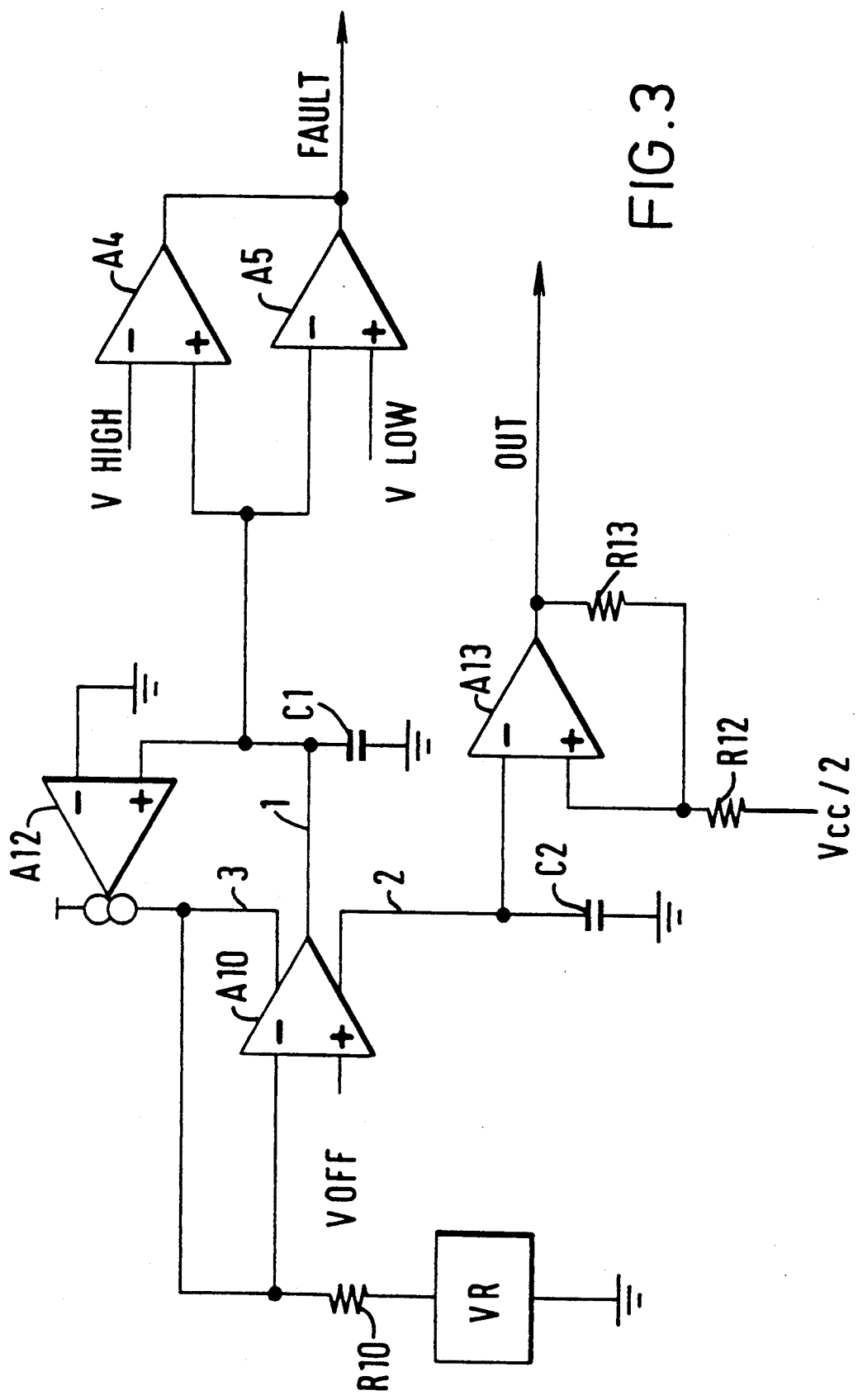
Figure 4:
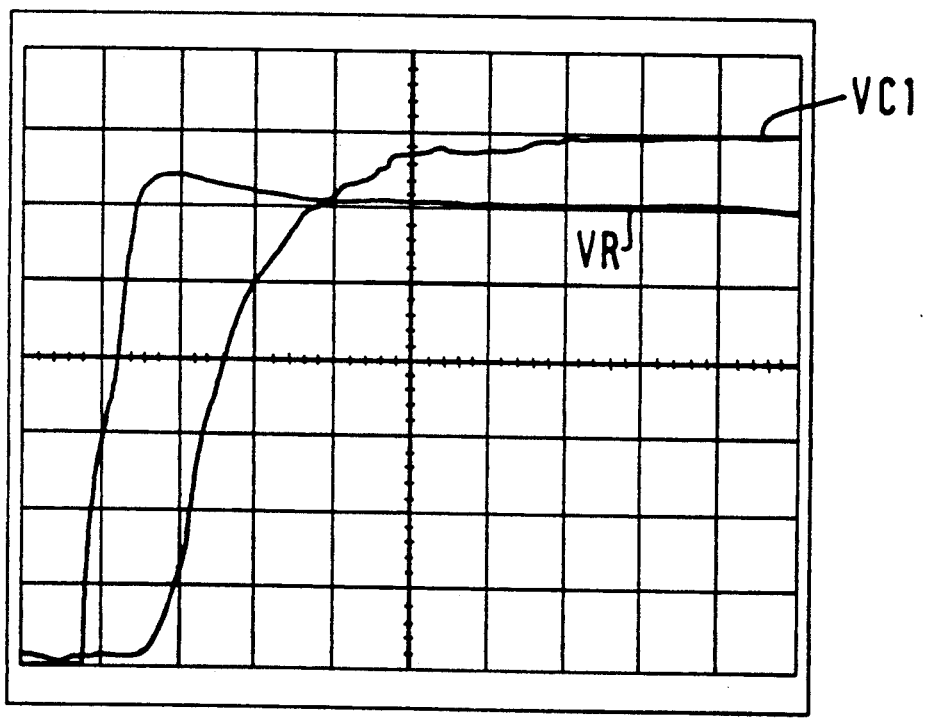
Figure 5A:
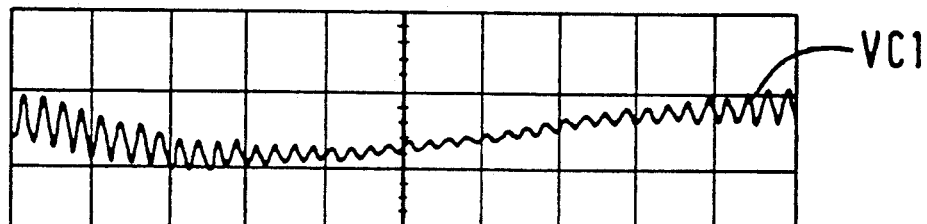
Figure 5B:
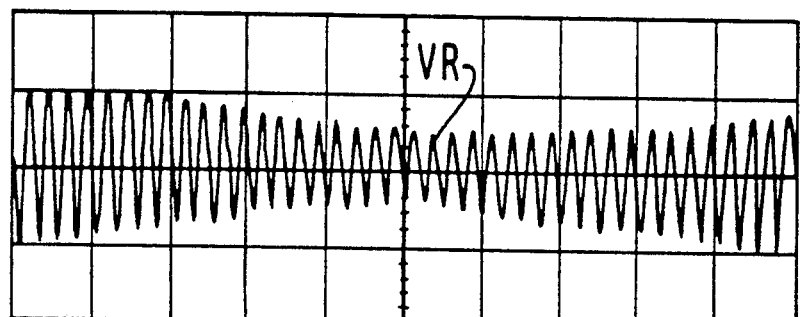
Figure 5C:
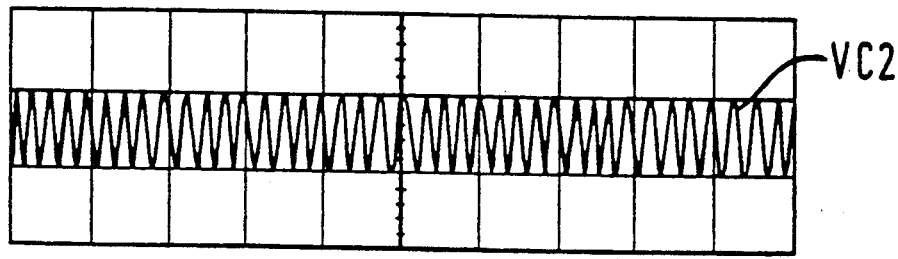

Embodiments of this invention will now be described by way of examples on with reference to the accompanying drawings, in which FIG. 1 is a diagram of a circuit for processing the output signal from a variable reluctance transducer;

FIGS. 2a-2c give traces showing the waveforms at the input of the circuit, on the filter capacitor and at the output of an integrator of the circuit when the transducer wheel is turning;

FIGURE 3 is a diagram of a second embodiment of a circuit for processing the output signal from a variable reluctance transducer;

FIG. 4 gives traces showing the changes occurring at power-up in the input voltage and charge on a first capacitor of the circuit of FIG. 3; and FIGS. 5a-5c give traces showing the waveforms at the input of the circuit of FIG. 3 and on first and second capacitors thereof when the transducer is in operation.

FIGS. 1 and 3 show respective embodiments of circuits for processing the output signal from a variable reluctance transducer VR. The transducer comprises a rotatably mounted wheel of magnetic material having a plurality of radially projecting teeth equally spaced around its circumference, and a fixed sensor which comprises a small electrical coil wound on a core. In the example under discussion, the toothed wheel is fitted to a roadwheel of a vehicle and the transducer is used to determine the rotary speed of the roadwheel. However, in other examples, the transducer may be used for sensing the rotary speed of any other element, for example the toothed wheel may be mounted to a shaft driven by an internal combustion engine of a vehicle and used to determine the rotary speed of the crankshaft. As the transducer wheel rotates and its successive teeth pass the sensor, the air gap between itself and the sensor varies cyclically, and therefore the reluctance of the magnetic path through the core of the sensor coil varies in a corresponding cyclical manner. The current flowing through the sensor coil therefore includes a high frequency component corresponding to the teeth of the transducer wheel passing the sensor. But also the current flowing through the sensor coil includes a low frequency component due e.g. to any eccentricity in the mounting of the transducer wheel.

In the circuit of FIG. 1, the sensor coil is represented by VR and has one end connected to ground and its other end connected to a supply rail by a series resistor R6. The junction between the transducer VR and resistor R6 is connected to the inverting input of an operational amplifier A1 via a series resistor R1, and is connected to the non-inverting input of the operational amplifier A1 via a low pass filter which comprises a series resistor R2 and a shunt capacitor C4. The operational amplifier A1 is connected as an integrator by means of a capacitor C3 connected between its output and its inverting input. A voltage limiting circuit VL is connected between the two inputs of the operational amplifier A1 and may comprise two diodes connected in anti-parallel, so that neither input can rise in voltage by more than one diode-drop above the other.

The output of the operational amplifier or integrator A1 is connected to a pair of active clamps each comprising an operational amplifier A2 or A3 and a diode D7 or D8. Thus, the output of the integrator A1 is connected to the inverting inputs of both operational amplifiers A2, A3, which have respectively high and low reference levels applied to their non-inverting inputs. The diodes D7 and D8 are oppositely poled relative to each other and connected between the output and inverting or signal input of the respective operational amplifier. A bistable circuit BC has its SET and RESET terminals connected to the outputs of the respective active clamps A2, D7 and A3, D8. Usually a buffer amplifier will be needed at each of the SET and RESET inputs to provide signals of adequate level to drive the bistable circuit BC.

The low pass filter capacitor C4 is connected to a window detector which comprises two operational amplifiers A4, A5 respectively connected as high and low threshold comparators. Thus, the capacitor C4 is connected to the non-inverting input of comparator A4 and to the inverting input of comparator A5, whilst the inverting input of comparator A4 and the non-inverting input of comparator A5 are connected respectively to high and low threshold levels V high and V low. In the example shown, the outputs of the two comparators A4, A5 are coupled together to give an output if the voltage on capacitor C4 either exceeds the high threshold level on A4 or falls below the low threshold level on A5. However instead the outputs may be taken separately from the two comparators, one giving an output only if the voltage on capacitor C4 exceeds the high threshold and the other giving a output only if the voltage on capacitor C4 falls below the low threshold level.

At power up the voltage at the junction between the transducer and resistor R6 rises to a level determined by the resistance of the sensor VR and also of resistor R6. Also, the voltage on the capacitor C4 rises, at a rate determined by the time constant of R2,C4, to a similar level. Then as the transducer wheel turns and its successive teeth pass the sensor, this causes the current through the sensor coil to vary cyclically and the voltage at the junction of the transducer with resistor R6 varies as shown at VR in FIG. 2: thus there is a high frequency component corresponding to the passage of the successive teeth of the transducer wheel past the sensor, but there may also be a low frequency component due to an eccentricity in the transducer wheel. Both the high frequency and low frequency components pass to the inverting input of operational amplifier A1, but the low pass filter R2, C4 passes substantially only the low frequency component to the non-inverting input. As a consequence, the output of the integrating operational amplifier A1 represents the high frequency component and is substantially free of any low frequency component, as shown by trace VA1 in FIG. 2. Further, the swing in voltage at the output of integrator A1 is limited in both directions by the respective active clamps A2, D7 and A3, D8: as limiting occurs in each direction, the bistable circuit BC switches states and the output from the bistable circuit is a square wave with 50% mark-space ratio. This is passed to a microprocessor which requires a waveform of this nature.

The circuit of FIG. 1 provides a high level of noise immunity differentiating the wheel rotation from brake squeal and locked-wheel oscillations. Thus, both these conditions can produce vibrations of the sensor assembly within the frequency range of operation, corresponding to a voltage output from the sensor comparable in amplitude to a true signal of lower frequency. This is due to the circuit being able to discriminate on the basis of signal energy content, these conditions producing signals of insufficient integral content to swing the integrator across its output hysteresis.

The maximum frequency at which the low pass filter operates is extended by the voltage limiting circuit VL on the input of the integrator A1, when the input voltage exceeds the limited threshold. At low rotational speeds the input signal is small and the voltage limiter is not effective. But as the rotational speed increases the input signal voltage increases and when the integrator output is limited, its input is no longer controlled and tends towards the input signal. Instead, when the input voltage exceeds the threshold of the voltage limiter, it starts conducting, shunting the current flowing through R1 into the filter capacitor C4. This additional current path effectively reduces the resistance seen between the VR input and C4, so forming a low pass filter with a higher corner frequency. Since this only occurs after the integrator output has effectively saturated and produced an output edge, only a small loss of signal occurs whilst integrating due to R2, C4.

The voltage on the filter capacitor C4 varies as shown at VC4 in FIG. 2 and thus substantially as the low frequency component in the signal from the transducer but with a high frequency ripple. The voltage on capacitor C4 is monitored by the window detector A4, A5. If the resistance of the transducer is abnormal, or the eccentricity of the toothed wheel is excessive, the transducer voltage and hence the voltage on C4 will exceed the window defined by A4, A5 to produce an output signal. This signal is passed to the microprocessor to indicate that the sensor is damaged and unreliable, but the microprocessor disregards the fault signal unless the detected rotary speed is nil or below a low threshold.

In the circuit of FIG. 3, the sensor coil is represented by VR and has one end connected to ground and its other end connected to one end of a series resistor R10. An operational amplifier A10 has its inverting input connected to the other end of resistor R10, and its non-inverting input connected to a reference voltage Voff, providing an offset voltage for the amplifier. The operational amplifier A10 is formed as an integrated component and is of a type having multiple outputs provided by multiple emitter areas in the output region, the emitter areas supplying equal output currents. In the example shown, there are twelve emitter areas: two of these provide equal output currents to output lines 1 and 2 from the amplifier, and the remaining ten emitter areas feed a third output line 3 with a current which is ten times the current fed to each of output lines 1 and 2. The line 3 from the amplifier A10 is connected to its inverting input as a bootstrap feedback A capacitor C1 is connected between the output 1 of amplifier A10 and ground. Capacitor C1 is further connected to the non-inverting input of a transconductance amplifier A12, having its inverting input connected to a reference level (ground). The output of the transconductance amplifier A12, which provides a current proportional to the difference in voltage between its two inputs, is connected to the input of amplifier A10. The capacitor C1 is also connected to a window detector which comprises two operational amplifiers A4, A5 respectively connected as high and low threshold comparators, as in the circuit of FIG. 1. In the example shown, the outputs of the two comparators are coupled together to give an output if the voltage on capacitor C1 either exceeds the high threshold Vhigh or falls below the low threshold Vlow. However instead the outputs may be taken separately from the two comparators, one giving an output only when the voltage on capacitor C1 exceeds the high threshold and the other giving an output only when the voltage on capacitor C1 falls below the low threshold.

A capacitor C2 is connected between the output line 2 of amplifier A10 and ground and is further connected to the inverting input of an operational amplifier A13 connected as a Schmitt trigger. Thus the non-inverting input of amplifier A13 is connected through a resistor R12 to a supply rail and a feedback resistor R3 is connected between the output of amplifier A13 and its noninverting input, the resistors R2 and R3 therefore defining the hysteresis of the Schmitt trigger circuit.

In a quiescent state, the voltage across resistor R10 and the sensor coil VR (i.e. the voltage on the inverting input to amplifier A10) is held at the offset voltage level Voff. Thus, at power up, initially the inverting input of amplifier A10 is at ground level, causing currents to start flowing from the outputs of this amplifier. The current on output line 3 flows through the bootstrap path and then through the series network of resistor R10 and sensor coil VR to ground. Initially also the capacitor C1 is at ground level and therefore the amplifier A12 does not produce any output current, but the current flowing on output line 1 of the amplifier A10 causes capacitor C1 to charge and soon amplifier A12 produces a rising current which adds to the current flowing through the R10, VR network from the bootstrap path. The voltage across resistor R10 and sensor coil VR quickly builds up so reducing the current outputs from the amplifier A10 and hence reducing the bootstrap component: however a stable condition is soon reached in which the input voltage to the amplifier A10 is held at the offset level Voff. In this stable quiescent state, the current flowing through the resistor R10 and sensor coil VR is the current flowing from the amplifier A12, there is no current flowing from the outputs of amplifier A10 and capacitor C1 maintains a voltage proportional to the resistance of the input network VR and R10. FIG. 4 shows the initial build up and subsequent stabilising of the input voltage VR to the amplifier A10, and also the initial charging VC1 of the capacitor C1.

As the transducer wheel turns and its successive teeth pass the sensor, this causes the current flowing through the input network VR,R10 to be varied cyclically and the voltage input to amplifier A10 to swing sharply in a corresponding cyclical manner. As a consequence, a current flows in the output line 3 from amplifier A10 which tends via the bootstrap to compensate the variations in the input network current. The currents in the output lines 1 and 2 from amplifier A10 similarly vary: capacitor C2 is of relatively large value so that variations in the current on output line 2 from the amplifier A10 cause the voltage on capacitor C2 to swing through a substantial range. The current variations which occur on output line 2 occur equally on the output line 1: however, capacitor C1 is of much larger value than capacitor C2 (typically a value 100 times greater than the value of C1), so that although the current variations are the same, the effect is to cause only a slight ripple in the voltage on the capacitor C1.

If the transducer wheel has any eccentricity in its mounting, then there will be a low frequency component in the varying current through the input network VR, R10 to amplifier A10, this low frequency component being superimposed on the high frequency component which has just been discussed. This causes a low frequency variation in the voltage VC1 on capacitor C1 as shown in FIG. 5, superimposed on the high frequency ripple, because the integral of the low frequency component in the current on output line 1 is relatively large compared to that of the wheel speed signal. The low frequency variation in the voltage VC1 on capacitor C1 is responded to by the amplifier A12, the changes in the output from amplifier A12 substantially nullifying the low frequency component in the input signal to amplifier A10. The effect of this is that the voltage on the input to amplifier A10 swings at the high frequency about a substantially constant level and the output to capacitor C2 is substantially free of any low frequency variation, whilst the voltage VC2 on capacitor C2 swings at the high frequency between two substantially constant levels, as shown in FIG. 5. The Schmitt trigger A13 responds to the cyclically varying voltage on capacitor C2 to provide a square wave output having a substantially 50% mark-space ratio. The repetition frequency of this waveform corresponds to the frequency of passage of the transducer teeth past the sensor in the variable reluctance transducer, and is therefore related to the rotary speed of the transducer wheel. The output from the Schmitt trigger A13 is passed to a microprocessor which requires this waveform to have a substantially 50% mark-space ratio.

If the eccentricity of the transducer wheel is excessive, then the low frequency variation in the voltage on capacitor C1 will stray outside the window defined by the window detector A4, A5 (either above the threshold Vhigh or below the threshold Vlow) to produce an output signal. This output signal is passed to the microprocessor to indicate that the speed signal may be unreliable owing to excessive eccentricity of the transducer wheel. Also, if the sensor coil should exhibit an abnormal resistance value (either going short circuit or open circuit), the voltage on capacitor C1 will go below threshold Vlow or above threshold Vhigh to produce an output from the window detector for the microprocessor.

I claim:

1. A circuit for processing an output signal from a variable reluctance transducer, the transducer output signal varying at high frequency but possibly including a low frequency component, the circuit comprising an input receiving said transducer output signal from the variable reluctance transducer (VR), and a comparing means having a first input receiving said transducer signal and a second input receiving said transducer signal via a low pass filter so that the comparing means provides an output representing the high frequency transducer signal and substantially unaffected by any said low frequency component therein, in which the comparing means comprises an integrator which integrates the difference between the signals applied to its two inputs.

2. A circuit for processing an output signal from a variable reluctance transducer, the transducer output signal varying at high frequency but possibly including a low frequency component, the circuit comprising an input receiving said transducer output signal from the variable reluctance transducer (VR), and a comparing means having a first input receiving said transducer signal and a second input receiving said transducer signal via a low pass filter so that the comparing means provides an output representing the high frequency transducer signal and substantially unaffected by any said low frequency component therein, further comprising an output circuit which produces a square wave from the output signal from the comparing means, in which said output circuit comprises a pair of active clamps and a bistable circuit having SET and RESET inputs controlled by respective ones of said active clamps.

3. A circuit for processing an output signal from a variable reluctance transducer, the transducer output signal varying at high frequency but possibly including a low frequency component, the circuit comprising an input receiving said transducer output signal from the variable reluctance transducer (VR), and a comparing means having a first input receiving said transducer signal and a second input receiving said transducer signal via a low pass filter so that the comparing means provides an output representing the high frequency transducer signal and substantially unaffected by any said low frequency component therein, in which the low pass filter includes a shunt capacitor, and in which a window detector is provided to monitor the capacitor voltage.

* * * * *